Patented Feb. 6, 1923.

1,444,406

UNITED STATES PATENT OFFICE.

WILLIAM R. WEBB, OF ROCHESTER, NEW YORK, ASSIGNOR TO EASTMAN KODAK COMPANY, OF ROCHESTER, NEW YORK, A CORPORATION OF NEW YORK.

CELLULOSE-ETHER COMPOSITION.

No Drawing. Application filed April 30, 1921. Serial No. 465,932.

*To all whom it may concern:*

Be it known that I, WILLIAM R. WEBB, a citizen of the United States of America, residing at Rochester, in the county of Monroe and State of New York, have invented certain new and useful Improvements in Cellulose-Ether Compositions, of which the following is a full, clear, and exact specification.

This invention relates to new compositions of matter in which cellulose ethers are mixed with other substances so that the resulting product can be advantageously used in the plastic and analogous arts, such, for instance, as sheet or film manufacture and varnish manufacture.

One object of my invention is to provide a composition which may be made into permanently transparent, strong and flexible sheets, films, or moulded articles which possess the desired properties in the plastic arts. Further objects will hereinafter appear.

I have discovered that a composition of matter having such useful properties may be obtained by mixing or compounding a cellulose ether like the type indicated in U. S. Patent No. 1,188,376, Lilienfeld, June 20, 1916, with ethylene chlorhydrin. This substance is by itself a solvent for the ethers, but it may also be used in conjunction with other compounds, as will be apparent to those skilled in the art.

I may dissolve, by way of illustration, cellulose ethers, like water-insoluble ethyl cellulose, in ethylene chlorhydrin until a strong, viscous, homogeneous solution is obtained. I may use 1 part of ether to from 4 to 6 parts of ethylene chlorhydrin, for instance, by weight.

In order to facilitate the drying of a composition containing the ethylene chlorhydrin, I may use a volatile vehicle in the mixture. For example, I may dissolve 1 part of a cellulose ether in from 2 to 3 parts of ethylene chlorhydrin and 2 to 3 parts of methyl alcohol. Many other equivalent volatile vehicles may be substituted, such as other lower monohydroxy aliphatic alcohols by which term I include those having less than six carbon atoms.

Other substances which impart qualities to the film may be added, if desired, such as triphenyl or tricresyl phosphate, camphor, monochlornaphthalene, etc., but these are not essential. The ingredients are of the ordinary commercial type, sufficiently purified for the process of film manufacture, so as to give a dope yielding films having the proper relative freedom from color.

Having thus described my invention, what I claim as new and desire to secure by Letters Patent is:

1. A composition of matter comprising cellulose ether and ethylene chlorhydrin.
2. A composition of matter comprising ethyl cellulose and ethylene chlorhydrin.
3. A composition of matter comprising cellulose ether, ethylene chlorhydrin and a volatile vehicle carrying said ingredients.
4. A composition of matter comprising cellulose ether, ethylene chlorhydrin and a lower monohydroxy aliphatic alcohol.
5. A composition of matter comprising water-insoluble ethyl cellulose, ethylene chlorhydrin and methyl alcohol.
6. As an article of manufacture, a deposited or flowed film comprising cellulose ether and ethylene chlorhydrin.
7. As an article of manufacture, a deposited or flowed flexible film comprising ethyl cellulose and ethylene chlorhydrin.

Signed at Rochester, New York, this 21st day of April 1921.

WILLIAM R. WEBB.